Patented Dec. 5, 1950

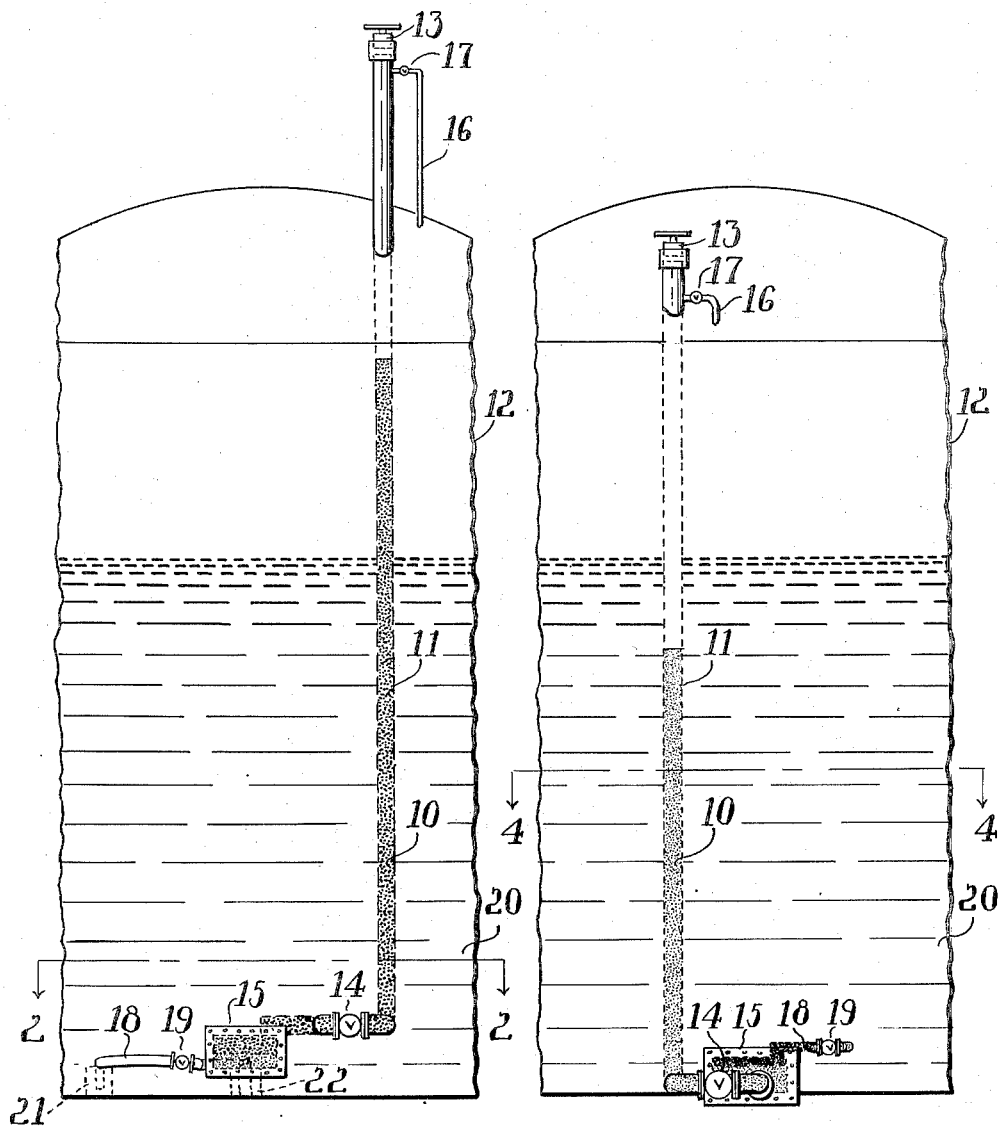

2,532,940

UNITED STATES PATENT OFFICE 2,532,940

LIQUID SEAL LEVEL GAUGE

Harold A. Quist, Elkton, Md., assignor to Sun Oil Company, Philadelphia, Pa., a corporation of New Jersey Application November 16, 1946, Serial No. 710,280

4 Claims. (Cl. 73—299)

This invention relates to devices for measuring the level of fluids in tanks or other containers and, more particularly, to that class of measuring devices adapted for use in sealed containers whereby the level of the tank contents is measured by the height of a sealing fluid in a measuring tube.

Fluid level gauges of the float and lever type are often unreliable in their indications, inconvenient to use and complicated in construction. Especially where the contents of the tanks to be gauged is a dense and highly viscous material, or is very volatile, the float type of valve is not a reliable level indicator. A measuring apparatus which can be corrected rapidly and easily for gaseous conditions and which is independent of mechanical error or failure is most desirable. The conditions found in the petroleum industry where large storage tanks are used to hold liquids of varying densities, viscosities and volatilities, require a level gauge to function within a sealed tank, operate under conditions existing within the tank, and be free of mechanical difficulties.

A primary object of this invention is, therefore, to provide a tank gauge which does not use floats, lever arms, or other mechanical means for indicating the level of the tank contents.

Another object is to provide a level gauge where the level of the tank contents is indicated by a separate sealing fluid in a measuring tube.

Yet another object is to provide an apparatus for transferring the fluid pressure of the tank contents to the measuring and sealing fluid without the use of diaphragms or other complicated mechanisms.

Still another object is to provide a liquid level gauge wherein the measuring element is a fluid which can be changed as required by the nature of the tank contents to be measured, the climate, temperature and other outside conditions which affect the accuracy of tank gauging.

A further object of this invention is to provide a liquid level indicating means which will operate under the actual pressure conditions existing within the tank, thereby attaining a high degree of accuracy in the measurement of the level of the tank contents.

Still a further object is to provide a liquid level indicator which will operate under conditions where the tank is sealed, thereby obtaining an accurate measure of the contents, and in the case of volatile liquids, preventing the escape of the gases and the consequent danger to the attending workmen.

The above and other objects, together with the novel features of this invention, will be apparent from the following description and the accompanying drawings, of which:

Figure 1 is a view showing a level gauge as assembled for operation where the measuring fluid has a specific gravity lower than the specific gravity of the tank contents.

Figure 3 is a view showing a level gauge as assembled for operation where the measuring fluid is of a specific gravity higher than the specific gravity of the tank contents.

Figure 5:
Figure 5 is a view of a measuring means.

In Figure 1 the liquid level gauge of my invention designed to be used with a measuring fluid or sealing medium 10 of specific gravity lower than the specific gravity of the tank contents 20, comprises a measuring tube 11 which in the preferred embodiment is entirely enclosed within the tank 12 except for a projection through the top of the tank to admit a measuring rod such as is shown in Figure 5 through plugged opening 13, and at the bottom of the tank when it projects through the tank to a valve connection 14, thence returning inside the tank to connect with the top of the sealed chamber 15, the front face of which is exterior to the tank 12. A gas pressure equalizing pipe or line 16 connects the measuring tube 11 where it projects through the top of the tank 12 to the gas space within the tank as shown. This line 16 is valved by a pressure equalizing cock 17 thereby adjusting the gas pressure in the measuring tube 11 to the conditions existing within the tank 12. A second tube 18 connects the bottom of the sealed chamber 15 to valve 19 by piercing the side of the tank 12 and then returns inside the tank where it is open to pressure of the tank contents generally denoted by 20. The two ends of the second tube 18 are turned downward into wells 21 and 22 respectively which prevent clogging of the tube 18 by the sediment from the tank contents.

Figure 2:
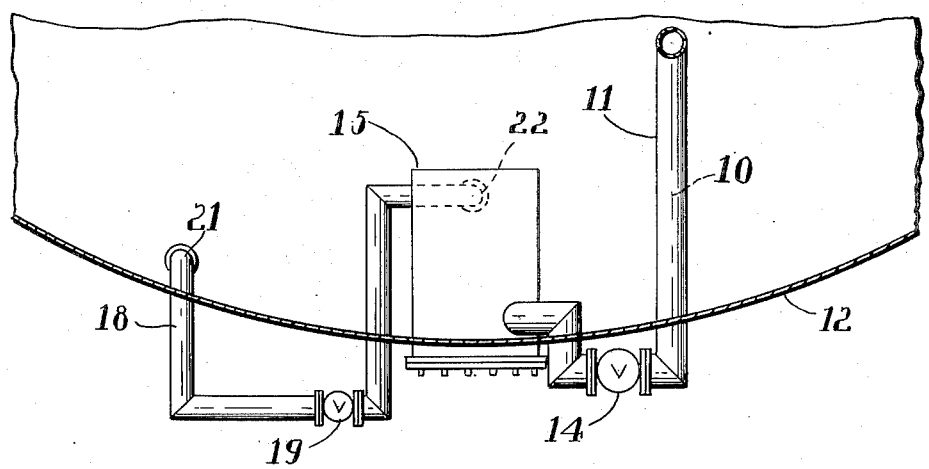
Figure 2 is a sectional view along lines 2—2 of Figure 1.

A sectional view more clearly showing the pipe and valve arrangement at the bottom of the tank, shown in elevation in Figure 1, is illustrated by Figure 2. The component parts bear the same numerical designation as described in Figure 1. The arrangement of the valves 14 and 19 and the removable cover of the sealed chamber 15 outside the tank, made necessary for the proper operation and cleaning of this gauge, are clearly shown. The relative positions of pipes 10 and 18 and the wells 21 and 22 for pipe 18 demonstrate the preferred embodiment where the gauging and sealing fluid is of a lower specific gravity than the contents of the container to be measured.

The preferred embodiment of my invention where the measuring fluid or sealing medium 10 has a specific gravity higher than the specific gravity of the tank contents 20 is illustrated in Figure 3 where like numbers are used to denote like parts already shown and discussed in Figure 1. It will be noted that the structure as shown in Figure 1 is repeated with slight change except that the measuring tube containing the sealing or measuring liquid enters the bottom of sealed chamber 15 and the second tube 18 open to the tank contents enters the top of the sealed chamber, thereby placing the liquids in the relative positions of their respective specific gravities.

Figure 4:
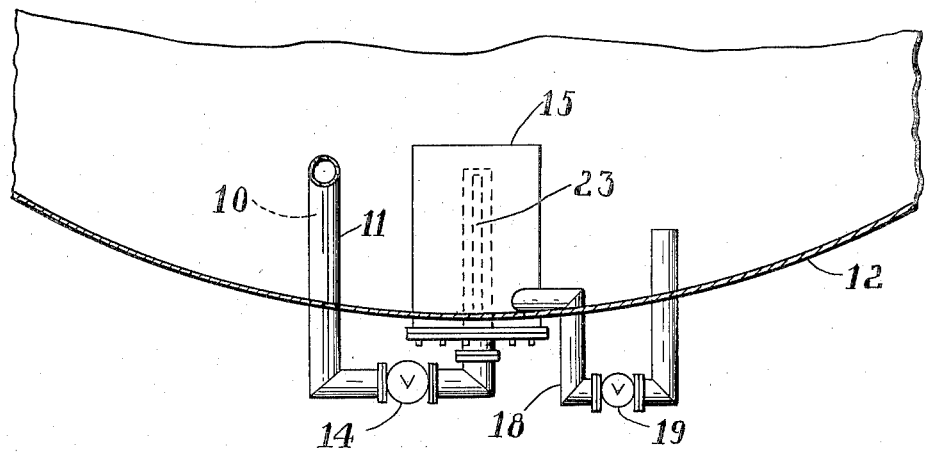
Figure 4 is a sectional view along lines 4—4 of Figure 3.

The detailed plan view of the elevation in Figure 3 is shown in Figure 4. In these two figures the wells which formed part of the equipment under conditions of the sealing and measuring fluid being of a lower specific gravity than the contents of the container illustrated in Figures 1 and 2, are missing. As shown in Figure 4, the relative elevations of the measuring tube 11 and the second tube 18, where they join the bottom of tank 12, are reversed. In the gauge illustrated, the sealing and measuring fluid has a specific gravity greater than the tank contents and is therefore introduced into the sealed chamber 15 beneath the fluid to be measured. Pipe 11 is further modified by slot 23 which is in the under side of the extension where it is shown inside the sealed chamber 15. This slot 23 controls the flow of the fluid 10, which is of a specific gravity higher than that of the tank contents, so that the stratification of the fluids is disturbed as little as possible.

In operation, after it is determined what fluid shall be used as the measuring or sealing medium 10, dependent on conditions of temperature, climate and the contents of the tank to be measured, the fluid is poured into the measuring tube 11 so as to fill the sealed chamber 15 which must have a volume at least as great as the volume of measuring tube 11. The measuring or sealing fluids will, in either case, displace the tank contents which have filled the sealed chamber 15 to a point representative of the depth of fluid to be measured. In gauging the level of the tank contents, valve 14 and pressure cock 17 are closed, thereby locking the sealing fluid at a level which reflects the actual pressure conditions existing within the tank. Plug 13 is removed and a measuring stick (Fig. 5), weighted tape or hollow tube calibrated to allow for variance in specific gravities of the sealing liquid and the tank contents, is inserted in measuring tube 11. The true level of the tank contents is then read from the calibrated measuring device. The plug 13 is replaced and valves 14 and 17 are opened, subjecting the measuring fluid to the effects of the normal tank conditions and preparing the gauge for the next measuring operation. Valve 19 in the second tube is used when it is necessary to remove the sealing or measuring fluid and clean the gauging apparatus. When the gauge is cleaned, valve 19 is closed, the exposed face plate of sealed chamber 15 is removed, and the sealing fluid is drained from the gauge bringing with it only that part of the tank contents which were in immediate contact with the sealing fluid. The loss of the tank contents is, therefore, kept to a minimum and it is not necessary to drain the tank to replace or change the sealing and measuring fluid.

I claim:

1. A gauge for measuring levels of liquid contents in a tank comprising a measuring tube passing through the tank, a sealed chamber on the bottom of the tank and in communication with the measuring tube, a pressure equalizing line connecting the gas space in the tank to the upper end of the measuring tube, a valve in the measuring tube adjacent said sealed chamber, the measuring tube and sealed chamber being adapted to contain a liquid of a specific gravity higher than the specific gravity of the tank contents, a second tube communicating with the sealed chamber and open to the tank contents at the bottom of the tank, a valve in said second tube, and a calibrated rod adapted for insertion in said measuring tube.

2. A gauge for measuring levels of liquid contents in a tank comprising a measuring tube passing through the tank, a sealed chamber on the bottom of the tank and in communication with the measuring tube, a pressure equalizing line connecting the gas space in the tank to the upper end of the measuring tube, a valve in the measuring tube adjacent said sealed chamber, liquid in the measuring tube and sealed chamber of a specific gravity lower than the specific gravity of the tank contents, a second tube communicating with the sealed chamber and open to the tank contents at the bottom of the tank, a valve in said second tube, and a calibrated rod adapted for insertion in said measuring tube.

3. A gauge for measuring levels of liquid contents in a tank comprising a measuring tube passing through the tank, a sealed chamber on the bottom of the tank and in communication with the measuring tube, a pressure equalizing line connecting the gas space in the tank to the upper end of the measuring tube, a valve in the measuring tube adjacent said sealed chamber, liquid in the measuring tube and sealed chamber of a specific gravity different from the specific gravity of the tank contents, a second tube communicating with the sealed chamber and open to the tank contents at the bottom of the tank, a valve in said second tube, and a calibrated rod adapted for insertion in said measuring tube.

4. A gauge for measuring levels of liquid contents in a tank comprising a measuring tube within said tank and projecting through the top thereof, a chamber in said tank communicating with the lower end of the measuring tube, said measuring tube and chamber adapted to contain liquid of a specific gravity different from the specific gravity of the tank contents, means for transferring pressure of liquid in the tank to the liquid in the measuring tube through said chamber, means to equalize the pressure in the gas space of the tank and the upper end of the measuring tube, liquid level locking means in the measuring tube and a calibrated rod adapted for insertion in said measuring tube to measure the liquid level therein.

HAROLD A. QUIST.

REFERENCES CITED

The following references are of record in the file of this patent:

UNITED STATES PATENTS

| Number | Name | Date |
| --- | --- | --- |
| 1,256,964 | Hurlbrink | Feb. 19, 1918 |
| 1,259,680 | Theobald | Mar. 19, 1918 |
| 1,567,758 | Schriever | Dec. 29, 1925 |
| 1,670,207 | Murphy | May 15, 1928 |
| 2,086,645 | Staber | July 13, 1937 |